United States Patent

Araki et al.

[11] Patent Number: 6,147,951
[45] Date of Patent: Nov. 14, 2000

[54] RECORDED INFORMATION REPRODUCTION METHOD AND RECORDED INFORMATION REPRODUCTION APPARATUS WITH MULTIPLE READING ELEMENTS

[75] Inventors: Yoshitsugu Araki; Junichi Furukawa; Hiroki Kuribayashi, all of Saitama, Japan

[73] Assignee: Pioneer Electronic Corporation, Tokyo, Japan

[21] Appl. No.: 09/158,098

[22] Filed: Sep. 22, 1998

[30] Foreign Application Priority Data

Sep. 22, 1997 [JP] Japan ................................ 9-257195

[51] Int. Cl.⁷ .................................................. G11B 7/00
[52] U.S. Cl. ...................... 369/95; 369/44.37; 369/44.28
[58] Field of Search ............................. 369/44.28, 44.37, 369/95

[56] References Cited

U.S. PATENT DOCUMENTS

5,457,670  10/1995  Maeda et al. ...................... 369/44.28
5,572,493  11/1996  Maeda et al. ...................... 369/44.28

*Primary Examiner*—Aristotelis M. Psitos
*Attorney, Agent, or Firm*—Morgan, Lewis & Bockius LLP

[57] ABSTRACT

A reproduction apparatus for reproducing data recorded on a disk having a plurality of tracks includes a spindle motor for rotating the disk, N reading components (N being a positive integer greater than one) for respectively producing N analog reading signals representing data recorded on the disk, N data reproduction circuits for converting the N analog reading signals to N serial digital signals, N memories for storing the N serial digital signals, a track jump device for moving the N reading means over adjacent N+1 tracks of the plurality of tracks, and a central processing unit for controlling operations of the N reading components, the N data reproduction circuits, the N memories, and the track jump device, and for rearranging the N serial digital signals so as to output a reproduction signal corresponding to the data recorded on the disk.

13 Claims, 8 Drawing Sheets

FIG. 7D ent application No. 9-257195, filed Sep. 22, 1997, which is hereby incorporated by reference.

RECORDED INFORMATION REPRODUCTION METHOD AND RECORDED INFORMATION REPRODUCTION APPARATUS WITH MULTIPLE READING ELEMENTS

This application claims the benefit of Japanese patent application No. 9-257195, filed Sep. 22, 1997, which is hereby incorporated by reference.

BACKGROUND OF THE INVENTION

1. Field of the Invention

This invention relates to a method for reproducing recorded information from a recording medium. It also relates to a recorded information a reproduction apparatus.

2. Discussion of the Related Art

In a conventional reproduction apparatus, recorded information is read from a plurality of recording tracks adjacent to each other simultaneously using a plurality of information reading means so as to achieve rapid information reproduction.

Figure 1A:
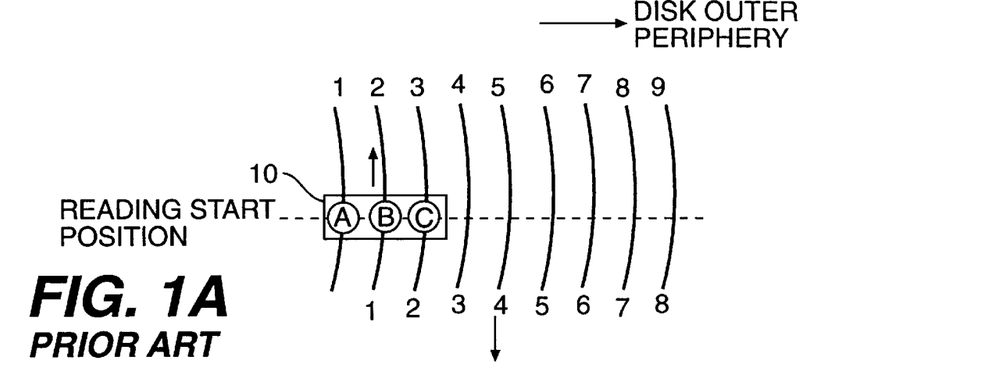
FIGS. 1A–1D show a conventional information reproduction method.
Figure 1B:
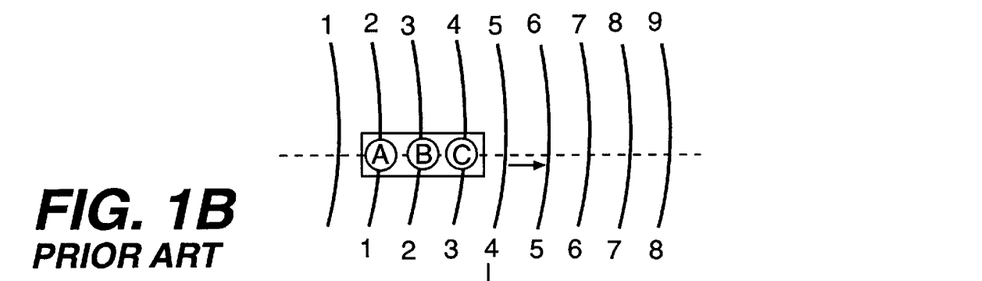
Figure 1C:
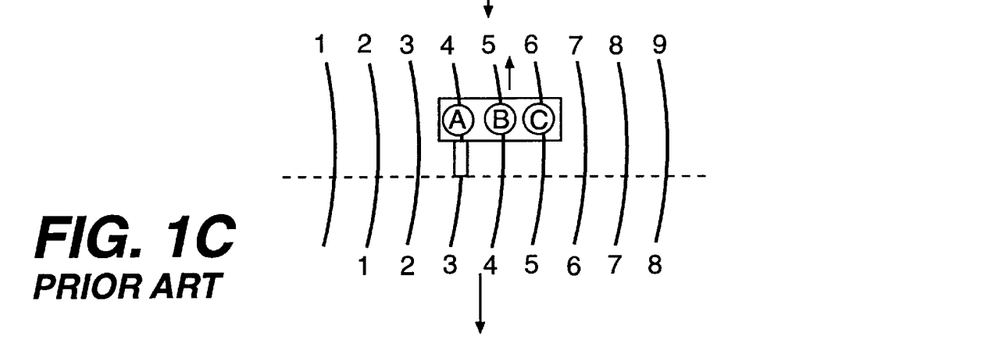

FIGS. 1A to 1C show a conventional recorded information reproduction method performed by a reproduction apparatus having a pickup containing three information reading means.

In FIGS. 1A to 1C, a single recording track formed spirally on a recording disk is segmented into tracks 1, 2, 3, . . . , counting from an inner diameter. First, referring to FIG. 1A, three reading means A to C are mounted on a pickup 10 for reading information from three tracks 1 to 3 adjacent to each other on the recording disk. When the recording disk makes a single rotation so that the pickup 10 reaches a position indicated in FIG. 1B, the reading of information from the tracks 1 to 3 by the reading means A to C is completed.

Next, to read information from tracks 4 to 6, the pickup 10 jumps over two tracks in a direction of an outer periphery of the disk from the position shown in FIG. 1B. Because the recording disk is rotating during the track jump, after completing the jump, the pickup 10 reaches a position ahead of the previous reading start position as indicated in FIG. 1C.

Figure 1D:
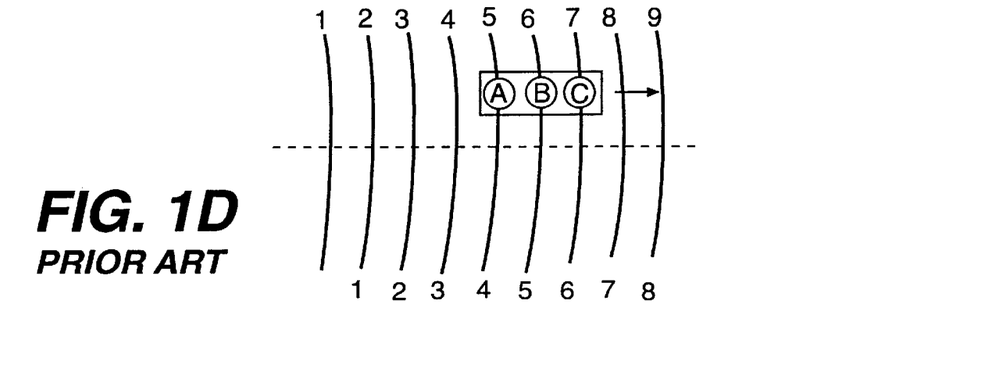

Next, the pickup 10 starts normal reading of information corresponding to a single rotation of the disk from the position indicated in FIG. 1C. When the recording disk makes the single rotation from the position indicated in FIG. 1C, after the single rotation of the recording disk, the pickup 10 reaches a position indicated in FIG. 1D, and reading of information from the tracks 4 to 6 is completed.

By repeated reading of information corresponding to a single rotation of the disk and alternately jumping the tracks, reading of information corresponding to three tracks is achieved every time the recording disk makes a single rotation.

However, because the recording disk is rotating while the pickup 10 is jumping over the tracks, a position of the pickup 10 just after the track jump is actually ahead of the last reading start position by a distance indicated by the shadow portion in FIG. 1C. Therefore, no reading is carried out in the shadow portion and information from this portion is missing. Thus, according to the conventional reproduction method, the same track (track 4 in this illustration) must be read again. Therefore, the conventional method has a problem in that an effective rapid reproduction of information cannot be performed.

SUMMARY OF THE INVENTION

Accordingly, the present invention is directed to recorded information reproduction method and recorded information reproduction apparatus that substantially obviates one or more of the problems due to limitations and disadvantages of the related art.

An object of the invention is to provide a recorded information reproduction method capable of rapid reproduction of information from a recording medium.

Another object of the present invention is to provide a reproduction apparatus for the rapid reproduction of information from a recording medium.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided an information reproduction method for simultaneously reading data from N tracks (N being a positive integer greater than one) formed on a recording disk by N reading components, the method including the steps of reading information corresponding to a single rotation of the recording disk by the N reading components, making the N reading components jump over (N+1) tracks in a direction toward a first track from a last track of data to be reproduced, and repeating the reading step and jumping step alternately until the reproduction of the data to be reproduced is completed.

In another aspect of the present invention there is provided a method for reading data from N tracks (N being a positive integer greater than one) formed on a recording disk by N reading components, the method including the steps of (a) rotating the recording disk in a reverse direction, (b) reading information corresponding to a single rotation of the recording disk by the N reading components in a reverse direction, (c) making the N information reading components jump over (N+1) tracks in a direction toward a last track from a first track of data to be reproduced, and (d) repeating (b) and (c) steps alternately until the reading of the data is completed.

In another aspect of the present invention there is provided a reproduction apparatus for reproducing data recorded on a recording disk, the apparatus including a disk rotating device for rotating the recording disk in a reverse direction, N reading components (N being a positive integer greater than one) for reading data from each of N tracks formed on the recording disk to obtain a reading signal, a reverse data reproduction device for reproducing data by demodulating the reading signal in reverse order, and a track jump device for making the N reading components jump over (N+1) tracks in a direction toward a last track from a first track of the data to be reproduced.

In another aspect of the present invention there is provided a reproduction apparatus for reproducing data recorded on a disk having a plurality of tracks, the apparatus including a spindle motor for rotating the disk, N reading components (N being a positive integer greater than one) for respectively producing N analog reading signals representing data recorded on the disk, N data reproduction circuits for converting the N analog reading signals to N serial digital signals, N memories for storing the N serial digital signals, a track jump device for moving the N reading components over adjacent N+1 tracks of the plurality of tracks, and a central processing unit for controlling operations of the N reading components, the N data reproduction circuits, the N memories, and the track jump device, and for rearranging the N serial digital signals so as to output a reproduction signal corresponding to the data recorded on the disk.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2:
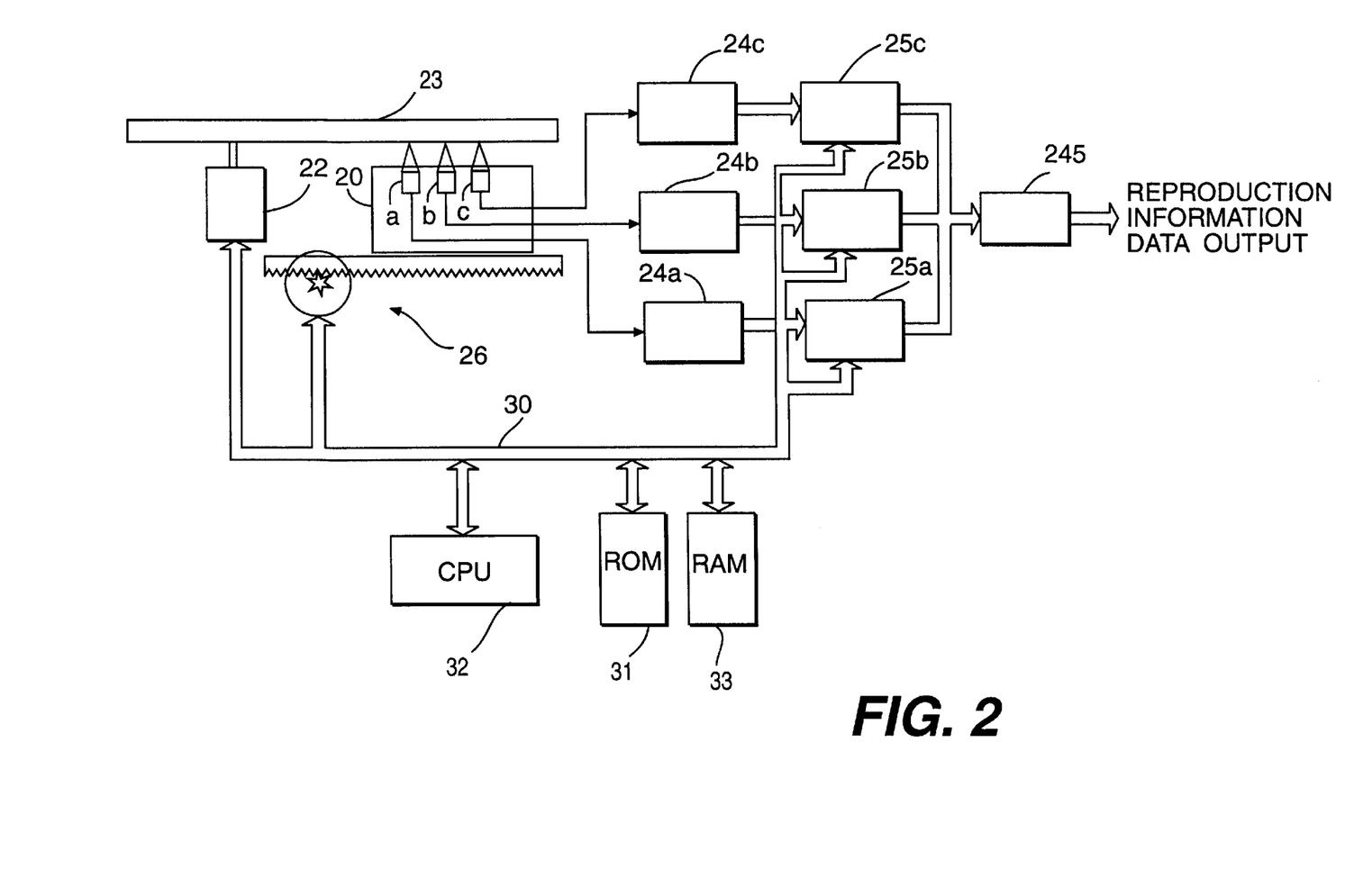
FIG. 2 shows a structure of an information reproduction apparatus according to the present invention.

FIG. 2 shows a structure of a reproduction apparatus according to the present invention. Referring to FIG. 2, a pickup 20 contains three reading components or pickup components a' to c'. The three reading means a' to c' form three light beams by dividing a laser beam from a light source such as a laser diode (not shown) mounted in or on the optical pickup 20. The reading means a' to c' read recorded information simultaneously from three tracks formed on a recording disk 23 rotated by a spindle motor 22. Although a single recording track is formed spirally on the recording disk 23, a portion of the spiral track corresponding to a single rotation of the disk is designated as a track in the following description of the present embodiment. In this example, it is assumed that data of data blocks whose first track and last track are predetermined, such as video data and audio data, is recorded in this recording track. It is also assumed that the information is recorded from the inner periphery to the outer periphery of the recording disk 23.

The reading means a' reads recorded information from a track of the recording disk 23 and outputs a reading signal to a data reproduction circuit 24a. The data reproduction circuit 24a converts the reading signal to a serial digital signal, demodulates the serial digital signal to reproduce original data, and outputs it to a memory 25a. The memory 25a successively stores data output from the data reproduction circuit 24a. The memory 25a reads the stored data according to a read instruction signal from a CPU 32 through a CPU bus 30 and outputs the data to an error correction circuit 245.

The reading means b' outputs a reading signal from a track adjacent to a track being read by the reading means a' to a data reproduction circuit 24b. The data reproduction circuit 24b converts the reading signal to serial digital signal, demodulates it to reproduce original data, and then outputs it to a memory 25b. The memory 25b successively stores the data output from the data reproduction circuit 24b. The memory 25b reads the stored data according to the reading instruction signal output by the CPU 32 through the CPU bus 30 and outputs the data to the error correction circuit 245.

The reading means c' outputs a reading signal from a track adjacent to the track being read by the reading means b' to a data reproduction circuit 24c. The data reproduction circuit 24c converts the reading signal to a serial digital signal, demodulates it to reproduce original data, and then outputs it to a memory 25c. The memory 25c successively stores data from the data reproduction circuit 24c. The memory 25c reads the stored data according to the reading instruction signal output by the CPU 32 through the CPU bus 30 and outputs the data to the error correction circuit 245.

The error correction circuit 245 carries out error correction processing for the data outputted successively from each of the memories 25a to 25c. Then, the data subjected to the error correction processing is outputted as reproduction data.

Figure 3:
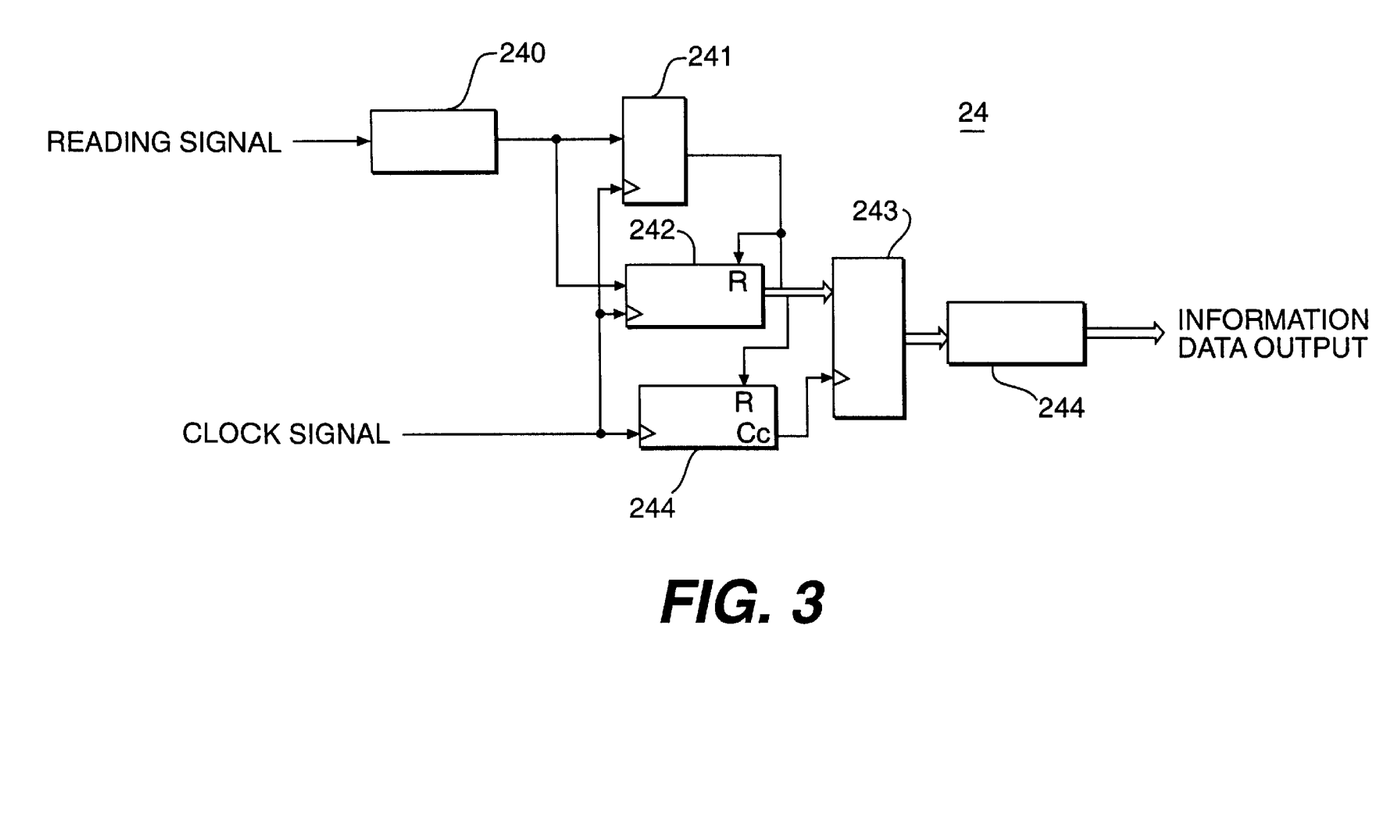
FIG. 3 shows an internal structure of a data reproduction circuit 24 of FIG. 2.

The data reproduction circuits 24a to 24c have the same internal structure, such as shown in FIG. 3.

In FIG. 3, a binary circuit 240 such as a comparator or an analog-to-digital converter converts an analog reading signal outputted by the reading means a' to c' into a serial digital signal based on a predetermined threshold value. The binary circuit 240 then outputs the serial digital signal to a synchronization detecting circuit 241 and a serial/parallel converter 242. The binary circuit 240 may employ a Viterbi decoding circuit. In this case, the reading signal is analog-to-digital converted to sample values, and the sample values are subjected to Viterbi decoding to produce a series of digital signals.

When a synchronization signal is detected in each physical sector of the serial digital signal, the synchronization detecting circuit 241 generates a reset signal only in the period in which the synchronization signal is being detected. The synchronization detecting circuit 241 then outputs the reset signal to the serial/parallel converter 242 and a dividing counter 244. The serial/parallel converter 242 converts the serial digital signal outputted from the binary circuit 240 to, for example, a 16-bit parallel digital signal, and then outputs the 16-bit parallel digital signal to a memory register 243. The serial/parallel converter 242 is reset by the reset signal output from the synchronization detecting circuit 241. Namely, the serial/parallel converter 242 fetches only N data portion, excluding the synchronization signal portion, of the reproduction digital signal and converts the data portion to parallel data. The dividing counter 244 divides a clock frequency of a clock signal from a master clock generator (not shown) by, for example, $\frac{1}{16}$, and outputs the divided clock signal to the memory register 243. The memory register 243 fetches the 16-bit parallel digital signal output from the serial/parallel converter 242 in accordance with the divided clock signal and stores it. The memory register 243 then outputs the 16-bit parallel reproduction digital signal to an 8/16 demodulator 244. The 8/16 demodulator 244 demodulates the parallel digital signal with 8/16 demodulation so as to restore the original data and output it.

Referring to FIG. 2, the spindle motor 22 drives the recording disk 23 in a rotation direction in accordance with a normal rotation instruction signal or a reverse rotation instruction signal output by the CPU 32 through the CPU bus 30. A slider mechanism 26 moves the pickup 20 along the disk radius and determines the position in accordance with a position control signal or a jump instruction signal output by the CPU 32 through the CPU bus 30.

A ROM (read only memory) 31 preliminarily stores software based on the information reproduction method of the present invention. The CPU (central processing unit) 32 generates the various instruction signals and transmits them through the CPU bus 30 according to the software in the ROM 31. The ROM 31, the CPU 32 and a RAM (random access memory) 33 are connected to the CPU bus 30.

The information reproduction operation will be described with reference to FIGS. 4A–4F.

FIGS. 4A–4F show operation of the pickup 20 for a data block A, whose last track, track 18, which is recorded on the recording disk 23, is read and reproduced.

Figures 4A, 4B:
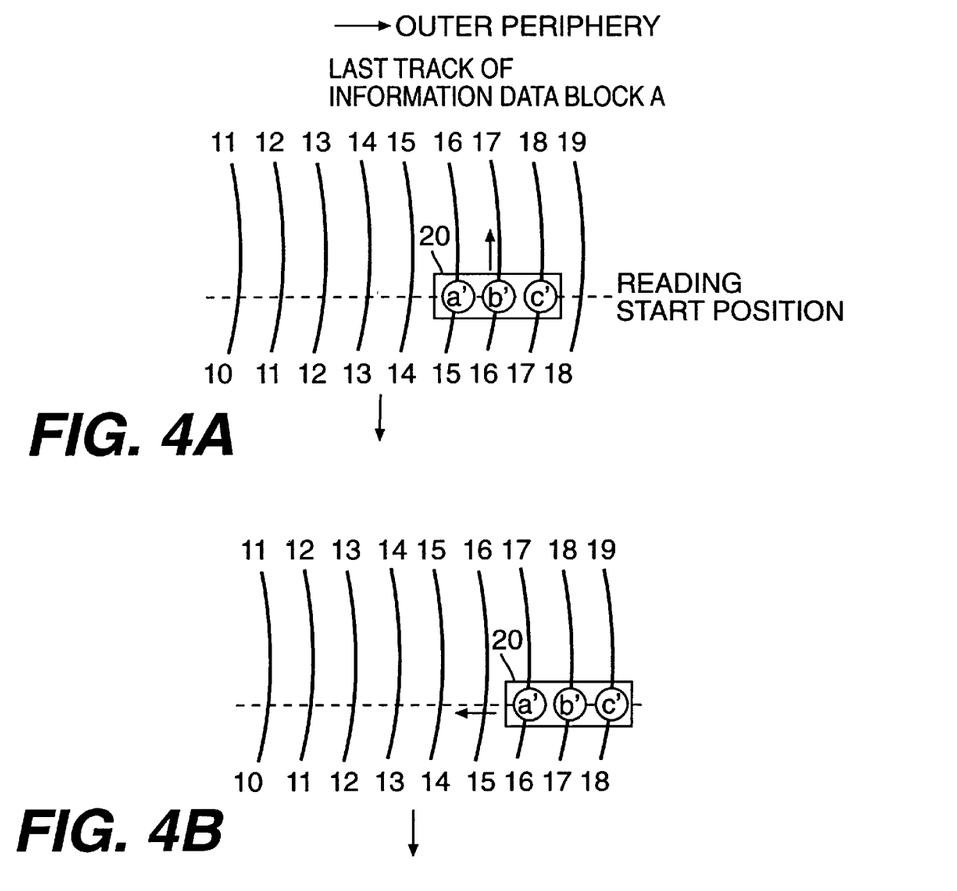
FIGS. 4A–4F explain a movement of a pickup according to the information reproduction method of the present invention.

First, the CPU 32 outputs a position control signal to the slider mechanism 26 for moving the pickup 20 to a start position of the last track 18 of the data block A through the CPU bus 30. The slider mechanism 26 carries the pickup 20 to the start position of the last track 18 of the data block A as shown in FIG. 4A in accordance with the position control signal. At this time, the CPU 32 supplies a normal rotation instruction signal to the spindle motor 22 through the CPU bus 30 for rotating the spindle motor 22 in a normal direction. The spindle motor 22 rotates the recording disk 23 in the normal direction in accordance with the normal rotation instruction signal. Then, the reading means a' to c' read information corresponding to a single rotation of the disk from the tracks 16, 17 and 18. The reading means a' to c' supply the reading signal to the data reproduction circuits 24a, 24b and 24c. The data reproduction circuits 24a to 24c convert reading signals to serial digital signals and demodulate them so as to reproduce the original data. The memories 25a, 25b and 25c successively store data reproduced by the data reproduction circuits 24a, 24b and 24c. Thus, data obtained by reading the track 16 is stored in the memory 25a, data obtained by reading the track 17 is stored in the memory 25b, and data obtained by reading the track 18 is stored in the memory 25c.

When the recording disk 23 makes a single rotation, the pickup 20 reaches a position shown in FIG. 4B. The CPU 32 then outputs a jump instruction signal to the slider mechanism 26 through the CPU bus 30 for making the pickup 20 jump over four tracks (the number of reading components plus 1) in the direction of disk inner periphery, that is, in a direction toward a first track of the data block A. When any one of three reading means a' to c' detects data or address read before the recording disk 23 makes a single rotation again, it is determined that reading of information corresponding to a single rotation of the recording disk 23 has been completed. Then the jump instruction signal is output to the slider mechanism 26.

The slider mechanism 26 makes the pickup 20 jump over four tracks in the direction of the disk inner periphery in accordance with the jump instruction signal. Because the recording disk 23 is rotating even while the pickup 20 is jumping over the tracks, a position of the pickup 20 after the jump is ahead of the last reading start position, namely, it is at a position shown in FIG. 4C.

Figure 4C:
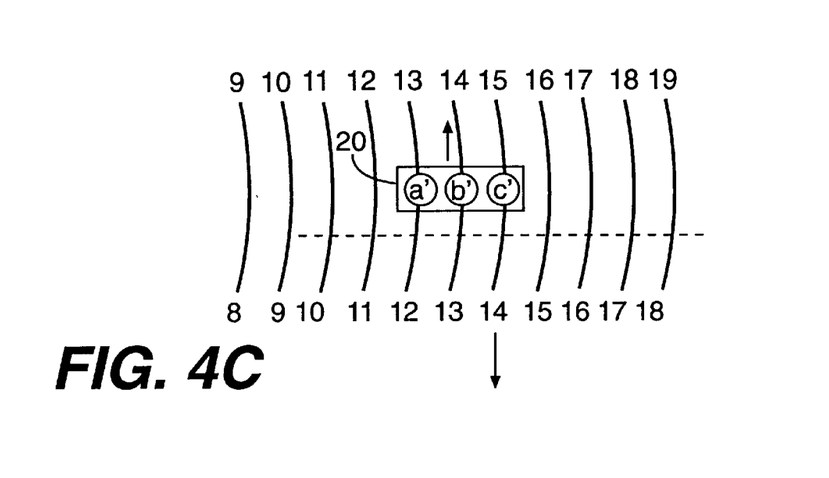

From the position shown in FIG. 4C, the reading means a' to c' read information corresponding to a single rotation of the disk again. As a result, the reading means a' to c' read information from the tracks 13, 14 and 15, respectively.

The reading means a' to c' supply the reading signals to the data reproduction circuits 24a, 24b, and 24c respectively. The data reproduction circuits 24a to 24c convert the reading signals to serial digital signals and demodulate them to reproduce the original data. The memories 25a, 25b, and 25c successively store data reproduced by the data reproduction circuits 24a, 24b, and 24c. Therefore, data obtained by reading the tracks 13 to 15 from a position shown in FIG. 4C are stored in the memories 25a to 25c, respectively.

As shown in FIG. 4C, the position where the pickup 20 starts to read information from the tracks 13 to 15 progresses in the reading direction with respect to the last reading start position (position indicated by broken line). Therefore, even when the pickup 20 reaches a position indicated in FIG. 4D after the recording disk 23 makes a single rotation, data in a section indicated by a shadow portion of FIG. 4D has not been read.

Next, the CPU 32 outputs a jump instruction signal to the slider mechanism 26 through the CPU bus 30 to make the pickup 20 jump over four tracks (the number of reading components plus 1) in the direction of the inner periphery, that is, in a direction toward the first track of the data block A. The slider mechanism 26 makes the pickup 20 jump over four tracks in the direction of the inner periphery in accordance with the jump instruction signal. Because the recording disk 23 is rotating even while the pickup 20 is jumping over the tracks, a position of the pickup 20 after the jump is ahead of the last reading start position as shown in FIG. 4E.

Figure 4D:
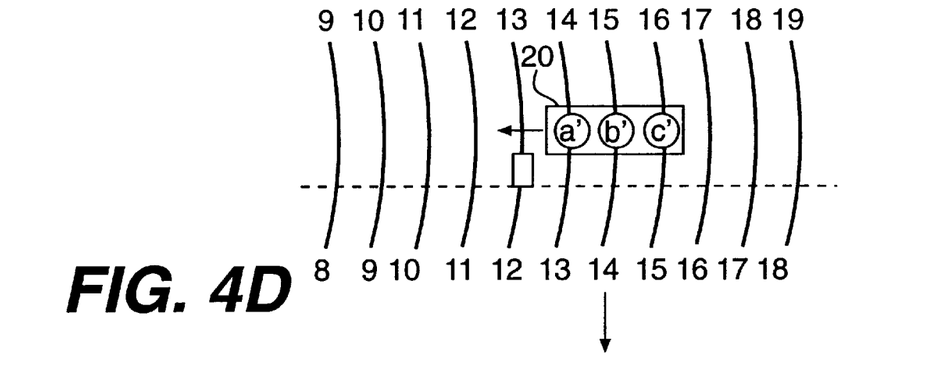
Figure 4E:
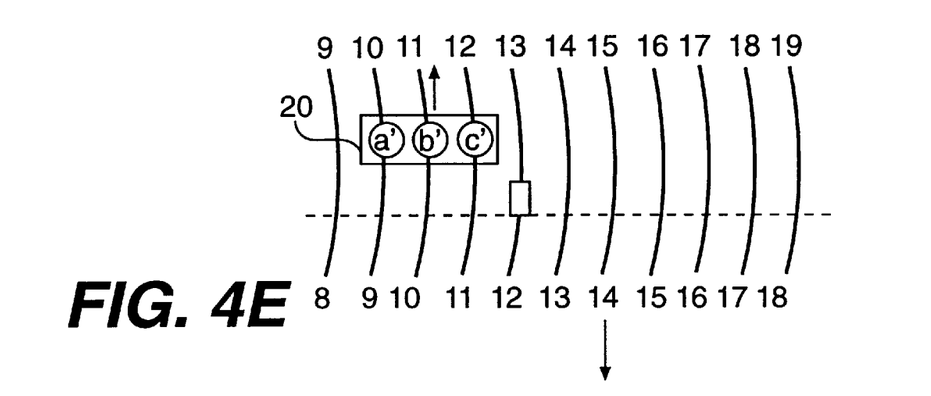

From the position indicated in FIG. 4E, the reading means a' to c' read information corresponding to a single rotation of the disk. As a result, the reading means a' to c' read information from the tracks 10, 11 and 12, respectively.

The reading means a' to c' output the reading signals to the data reproduction circuits 24a, 24b, and 24c. The data reproduction circuits 24a, 24b, and 24c convert the reading signals to serial digital signals and demodulate these signals so as to reproduce the original data. The memories 25a, 25b, and 25c successively store the data reproduced by the data reproduction circuits 24a, 24b, and 24c. Therefore, the data read from the tracks 10 to 12 from the position shown in FIG. 4E is stored in the memories 25a to 25c, respectively.

Figure 4F:
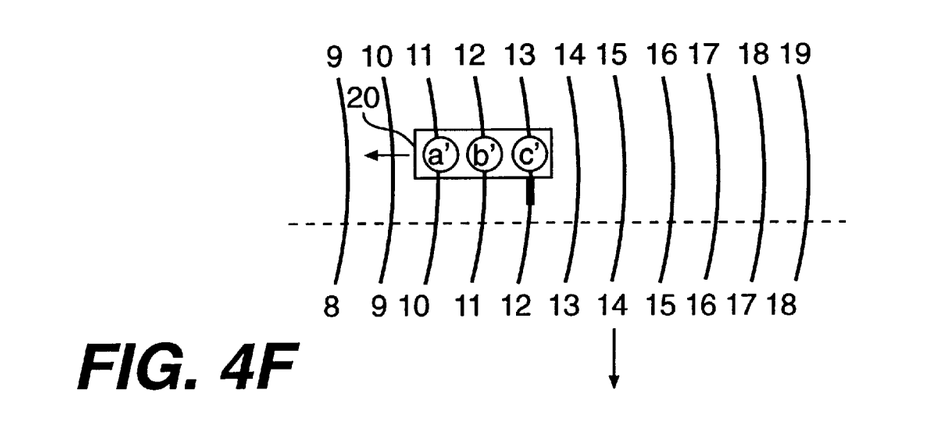

The operations shown in FIGS. 4E and 4F are repeated alternately until the first track of the data block A is reached. Consequently, the data block A recorded in the recording disk 23 is read successively from the last track to the first track in which information is recorded, and stored discretely in the memories 25a to 25c.

Next, the CPU 32 outputs a reading signal repeatedly and alternately to the memories 25a to 25c in order to rearrange the data stored discretely in the memories 25a to 25c in a desired order. The rearranged data block A is output to the error correction circuit 245. After error correction processing by the error correction circuit 245, the data is outputted as reproduction data.

In the above described reproduction operation, the section indicated by the shadow portion which has not been read out in FIGS. 4D and 4E is read by the reading components c' in FIG. 4F. Therefore, no information is missing throughout the reproduction. Although in this case a section indicated by a bold line in FIGS. 4D and 4F is read twice, the CPU 32 does not store data read for the second time in the memories 25a to 25c. Meanwhile, the data that is read twice may be written into the memories 25a to 25c. This overlapping data will not be read out from the memory 25a to 25c.

As described above, with the operation of reading information corresponding to a single rotation of the disk by the three reading means a' to c' and the operation of making the pickup 20 jump over four tracks in the direction from the last track to the first track of the data block alternately and repeatedly, highly efficient, rapid information reproduction is achieved without losing any information.

Although the above embodiment has been described with three reading components as an example, the number of the reading components is clearly not restricted to three.

That is, when information is read from a plurality of, that is, N tracks (N being positive integer) simultaneously using a plurality of, that is, N reading components, an operation of reading information corresponding to a single rotation of the disk by the N reading components and an operation of making the reading components jump over (N+1) tracks from the last track to the first track of data block are alternately and repeatedly performed.

In the embodiment shown in FIGS. 4A to 4F, the pickup jumps over tracks in an opposite direction, that is, from the last track to the first track of a data block. However, effective rapid information reproduction can similarly be achieved by rotating the recording disk 23 in a reverse direction and reading the information in an opposite direction compared to the normal reading direction.

Figure 5:
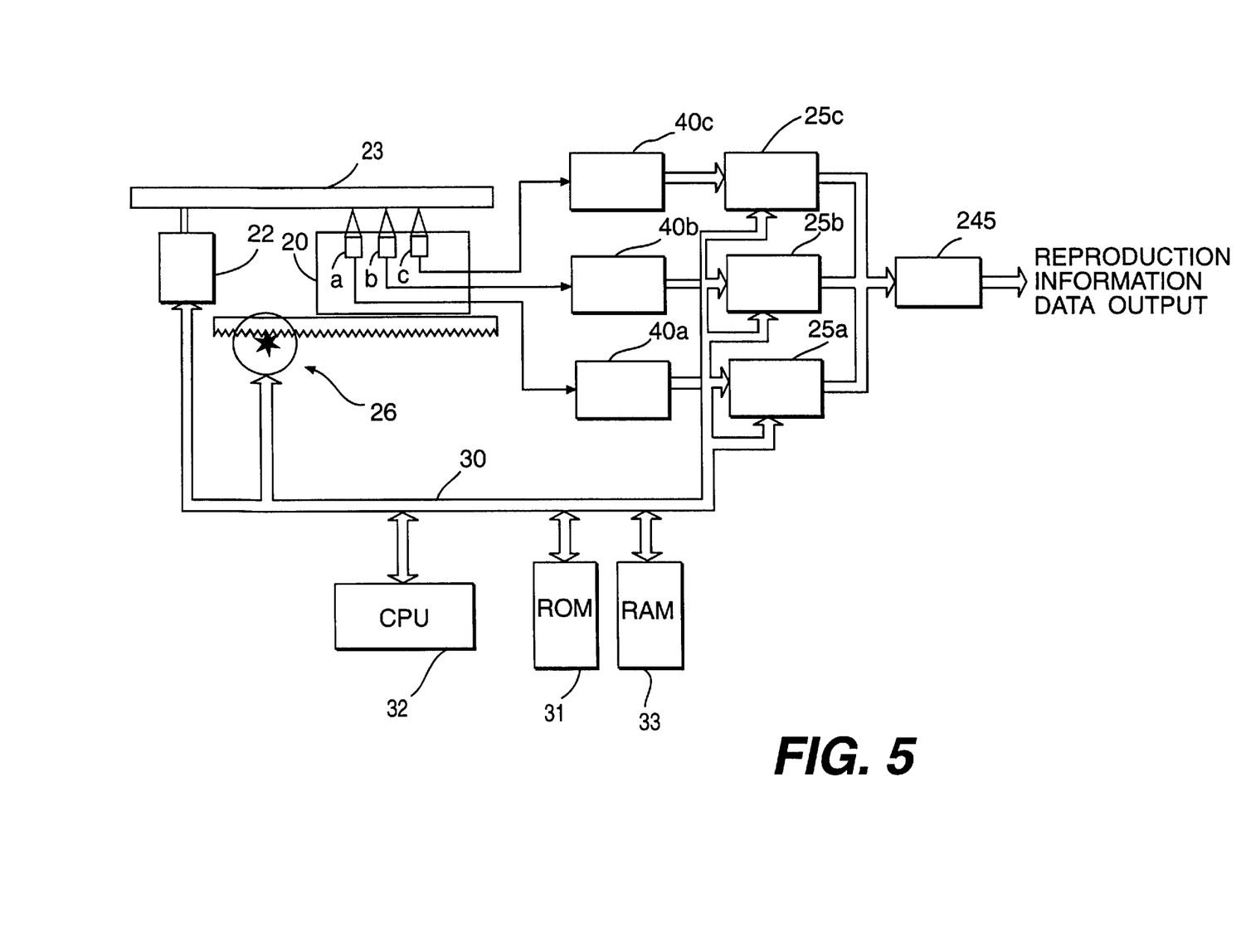
FIG. 5 shows other structure of the reproduction apparatus according to the present invention.

FIG. 5 is a diagram showing another embodiment of the present invention reflecting the above concept.

In the structure shown in FIG. 5, functional modules such as those other than the reverse data reproduction circuits 40a to 40c are the same as those shown in FIG. 2. Therefore, their description is omitted.

In FIG. 5, a reverse data reproduction circuit 40a converts a reading signal from a reading means a' to a serial digital signal. The reverse data reproduction circuit 40a then demodulates the serial digital signal from an opposite direction in time series to reproduce the original data and output it to the memory 25a. Further, the reverse data reproduction circuit 40b converts a reading signal from a reading means b' into a serial digital signal and then demodulates it from an opposite direction in time series so as to reproduce the original data. The demodulated data is output to the memory 25b. Similarly, the reverse data reproduction circuit 40c converts a reading signal from the reading means c' into a serial digital signal, demodulates it from an opposite direction in time, and outputs original data to a memory 25c.

Figure 6:
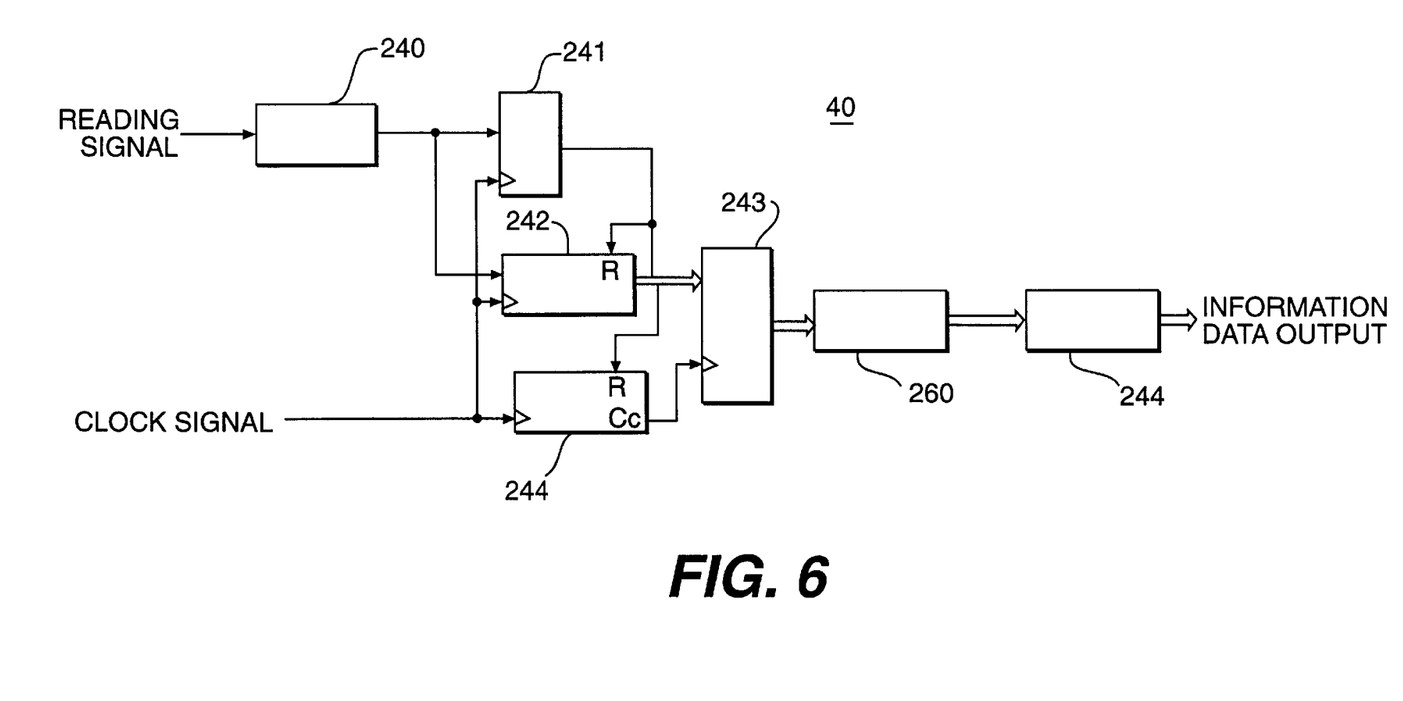
FIG. 6 shows an internal structure of the data reverse reproduction circuit 40 in FIG. 5.

The reverse data reproduction circuits 40a to 40c all have the same internal structure, such as shown in FIG. 6.

Referring to FIG. 6, a binary circuit 240 such as a comparator or an analog-to-digital converter converts an analog reading signal output from the reading means a' to c' of the pickup 20 to a serial digital signal based on a predetermined threshold value. The binary circuit 240 then outputs the serial digital signal to a synchronization detecting circuit 241 and a serial/parallel converter 242. The binary circuit 240 may employ a Viterbi decoding circuit. If so, the reading signal is A/D converted to sample values, and the sample values are subjected to Viterbi decoding to obtain a binary signal. When a synchronization signal is detected in each physical sector of the digital signal, the synchronization detecting circuit 241 generates a reset signal only during the period when the synchronization signal is being detected. The synchronization detecting circuit 241 outputs the reset signal to the serial/parallel converter 242 and a dividing counter 244. The serial/parallel converter 242 converts the serial digital signal from the binary circuit 240 to, for example, a 16-bit parallel digital signal and then outputs the 16-bit parallel digital signal to a memory register 243. The serial/parallel converter 242 is reset while the reset signal is on. The serial/parallel converter 242 fetches only the recorded data portion, excluding the synchronization signal portion of the serial digital signal, and converts it to parallel data. The dividing counter 244 divides the clock frequency of a clock signal output from a master clock generator (not shown) by, for example, $\frac{1}{16}$, and outputs the divided clock signal to the memory register 243. The memory register 243 fetches the 16-bit parallel digital signal from the serial/parallel converter 242 in accordance with the divided clock signal, stores it, and then outputs it to a bit order inverter 260. The bit order inverter 260 inverts the bit order between MSB (most significant bit) and LSB (least significant bit) of the 16-bit parallel digital signal from the memory register 243 for every 16 bits. The bit order inverter 260 then outputs the inverted signal to an 8/16 demodulator 244. The 8/16 demodulator 244 performs 8/16-demodulation on the digital signal in which the bit order is inverted, restoring and outputting the original data.

The information reproduction operation from the recording disk 23 by the apparatus shown in FIG. 5 will be described together with a movement of the pickup 20 shown in FIGS. 7A–7D.

FIGS. 7A–7D show a motion of the pickup 20 when data block A, whose first track is track 1, is read and reproduced.

Figure 7A:
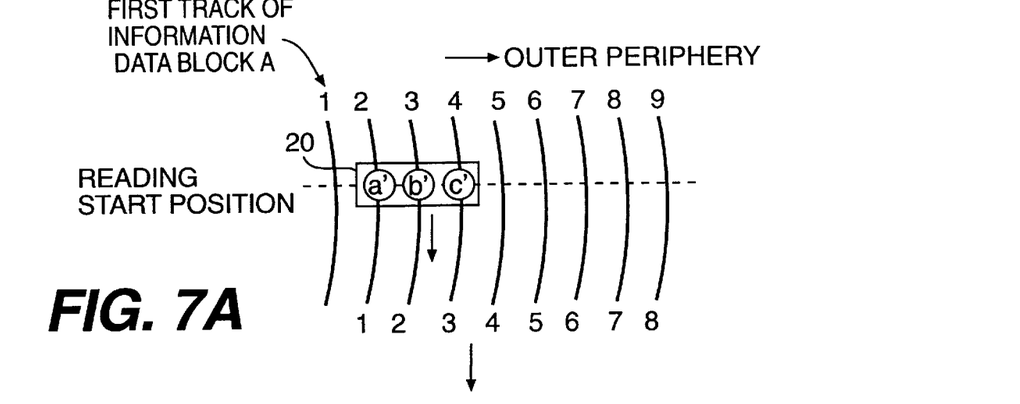
FIGS. 7A–7D explain a movement of the pickup carried out by the apparatus shown in FIG. 5.

First, the CPU 32 outputs a position control signal to a slider mechanism 26 through the CPU bus 30. The position control signal is used for moving the pickup 20 to an end of the first track of the data block A. The slider mechanism 26 carries the pickup 20 to the end position of the first track I of the data block A in accordance with the position control signal as shown in FIG. 7A. At this time, the CPU 32 outputs a reverse rotation instruction signal to the spindle motor 22 through the CPU bus 30, to rotate the spindle motor 22 in a reverse direction. The spindle motor 22 rotates the recording disk 23 in the reverse direction in accordance with the reverse rotation instruction signal. Then, the reading means a' to c' mounted on the pickup 20 start reading information in an opposite direction from the end position to the first position of the tracks 1, 2 and 3.

The reading means a' to c' output reading signals obtained by reading the tracks during the reverse rotation to the reverse data reproduction circuits 40a to 40c. The reverse data reproduction circuits 40a to 40c convert the reading signals into serial digital signals and demodulate them in reverse order so as to reproduce the original data. The reverse data reproduction circuits 40a to 40c then supply the demodulated signals to the memories 25a, 25b and 25c. Therefore, data obtained by reading the tracks 1 to 3 is written into the memories 25a to 25c.

Figure 7B:
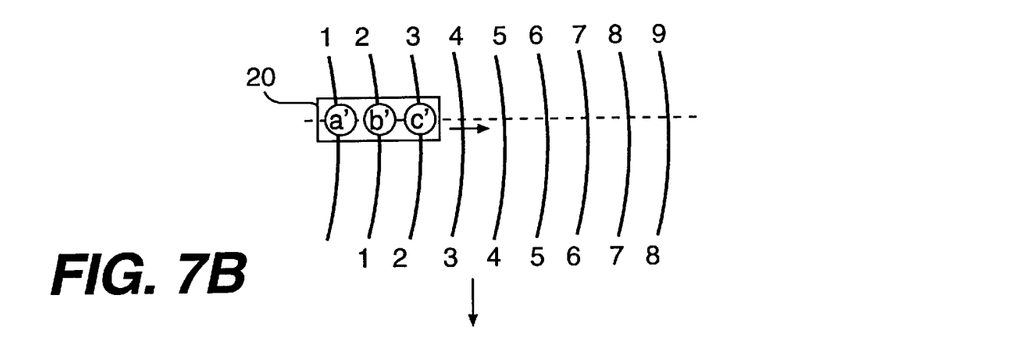

When the recording disk 23 makes a single rotation, the pickup 20 reaches a position shown in FIG. 7B. The CPU 32 outputs a jump instruction signal to the slider mechanism 26 through the CPU bus 30 to make the pickup 20 jump over four tracks (the number of reading components plus 1) in the direction of the disk outer periphery, that is, in a direction toward the last track of the data block A. The slider mechanism 26 makes the pickup 20 jump over four tracks in the direction of the disk outer periphery in accordance with the jump instruction signal. Since the recording disk 23 is rotating while the pickup 20 is jumping over the tracks, a position of the pickup 20 after the jump is progressed in the reading direction from the last reading start position is as shown in FIG. 7C.

Figure 7C:
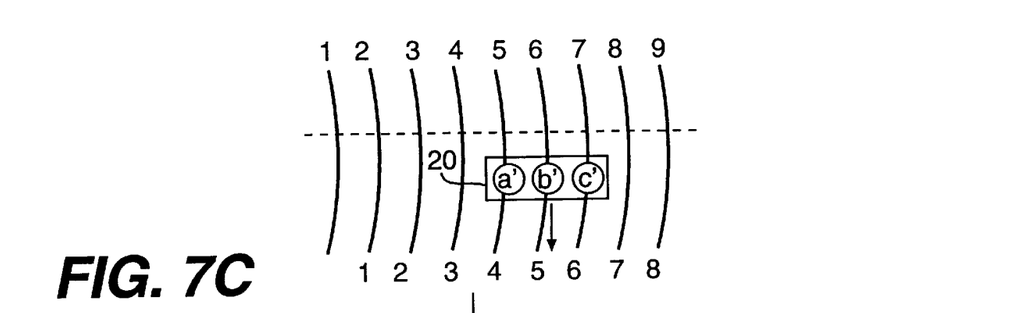

From the position shown in FIG. 7C, the reading means a' to c' again read information corresponding to a single rotation of the disk in the opposite direction to the normal reading direction. Then, the reading means a' to c' start to read information from the tracks 4, 5 and 6, in the opposite direction from an end position of each track to a start position. The reading means a' to c' output the reading signal obtained by the reverse reading to the reverse data reproduction circuits 40a to 40c. The reverse data reproduction circuits 40a to 40c convert the reading signals successively to serial digital signals and then demodulate them in reverse order so as to reproduce the original data. The reverse data reproduction circuits 40a to 40c output the demodulated data to the memories 25a, 25b and 25c. Therefore, data obtained by reading the tracks 4 to 6 is written into the memories 25a to 25c.

Figure 7D:
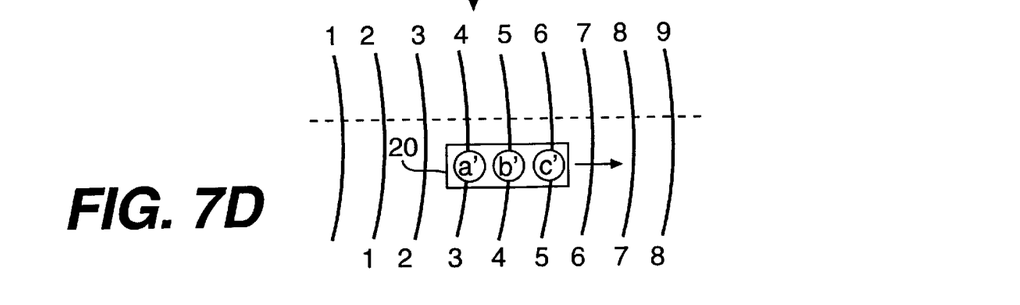

The operations shown in FIGS. 7C and 7D are carried out alternately and repeatedly until the last track of the data block is read.

As explained above, according to the second embodiment of the present invention, data recorded on the recording disk 23 is read in reverse order. Thus, effective rapid information reproduction is achieved without the missing of information as shown in the shadow portion of FIG. 1C throughout the reproduction.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. An information reproduction method for simultaneously reading data from N tracks (N being a positive integer greater than one) formed on a recording disk by N reading components, the method comprising the steps of:

reading information corresponding to a single rotation of the recording disk by the N reading components;

making the N reading components jump over (N+1) tracks in a direction toward a first track from a last track of data to be reproduced; and repeating the reading step and jumping step alternately until reproduction of the data to be reproduced is completed.

2. The method of claim 1, wherein the N reading components read data from N tracks adjacent to each other.

3. A method for reading data from N tracks (N being a positive integer greater than formed on a recording disk by N reading components, the method comprising the steps of:

(a) rotating the recording disk in a reverse direction;

(b) reading information corresponding to a single rotation of the recording disk by the N reading components in a reverse direction;

(c) making the N information reading components jump over (N+1) tracks in a direction toward a last track from a first track of data to be reproduced; and (d) repeating steps (b) and (c) alternately until the reading of the data is completed.

4. The method of claim 3, wherein the N reading components read data from N tracks cent to each other.

5. A reproduction apparatus for reproducing data recorded on a recording disk, the apparatus comprising:

a disk rotating device for rotating the recording disk in a reverse direction;

N reading means (N being a positive integer greater than one) for reading data from each of N tracks formed on the recording disk to obtain a reading signal;

reverse data reproduction means for reproducing data by demodulating the reading signal in reverse order; and track jump means for making the N reading means jump over (N+1) tracks in a direction toward a last track from a first track of the data to be reproduced.

6. A reproduction apparatus for reproducing data recorded on a disk having a plurality of tracks, the apparatus comprising:

a spindle motor for rotating the disk;

N reading components (N being a positive integer greater than one) for respectively producing N analog reading signals representing data recorded on the disk;

N data reproduction circuits for converting the N analog reading signals to N serial digital signals;

N memories for storing the N serial digital signals;

track jump means for moving the N reading components over adjacent N+1 tracks of the plurality of tracks; and a central processing unit for controlling operations of the N reading means, the N data reproduction circuits, the N memories, and the track jump components, and for rearranging the N serial digital signals so as to output a reproduction signal corresponding to the data recorded on the disk.

7. The reproduction apparatus of claim 6, wherein the spindle motor rotates the disk in a reverse direction, wherein the data is reproduced and stored in the N memories in a reverse order, and wherein the central processing unit rearranges the data so as to output the data in an order the data is recorded on the disk.

8. The reproduction apparatus of claim 6, wherein the N data reproduction circuits each employ a Viterbi decoding circuit for converting the N analog reading signals to N serial digital signals.

9. The reproduction apparatus of claim 6, wherein the N data reproduction circuits include a serial to parallel converter to convert signals received from a portion of the disk not read during a time when the N reading means are being moved over the adjacent N+1 tracks by the track jump means.

10. The reproduction apparatus of claim 6, wherein the N reading means read data from N tracks adjacent to each other.

11. The reproduction apparatus of claim 6, wherein the track jump means moves the N reading means in a direction from a last track of a data block to be reproduced to a first track of the data block.

12. The reproduction apparatus of claim 7, wherein the track jump means moves the N reading means in a direction from a first track of a data block to be reproduced to a last track of the data block.

13. The reproduction apparatus of claim 6, wherein the N reading means form N light beams by dividing laser light from a laser diode mounted on an optical pickup.

* * * * *

UNITED STATES PATENT AND TRADEMARK OFFICE
CERTIFICATE OF CORRECTION

PATENT NO. : 6,147,951  
DATED : November 14, 2000  
INVENTOR(S) : Yoshitsugu Araki et al.

Page 1 of 1

It is certified that error appears in the above-identified patent and that said Letters Patent is hereby corrected as shown below:

Column 9, claim 3,
Line 51, after "than" insert -- one --.

Column 9, claim 4,
Line 64, change "cent" to -- adjacent --.

Signed and Sealed this

Nineteenth Day of March, 2002

Attest:

Attesting Officer

JAMES E. ROGAN
Director of the United States Patent and Trademark Office